A. M. A. JOLIOT.
SPEED INDICATOR.
APPLICATION FILED DEC. 6, 1916.

1,231,899.

Patented July 3, 1917.
3 SHEETS—SHEET 1.

Inventor:
André M. A. Joliot
By Paul Noimelzke
Attorney.

A. M. A. JOLIOT.
SPEED INDICATOR.
APPLICATION FILED DEC. 6, 1916.
1,231,899.
Patented July 3, 1917.
3 SHEETS—SHEET 2.
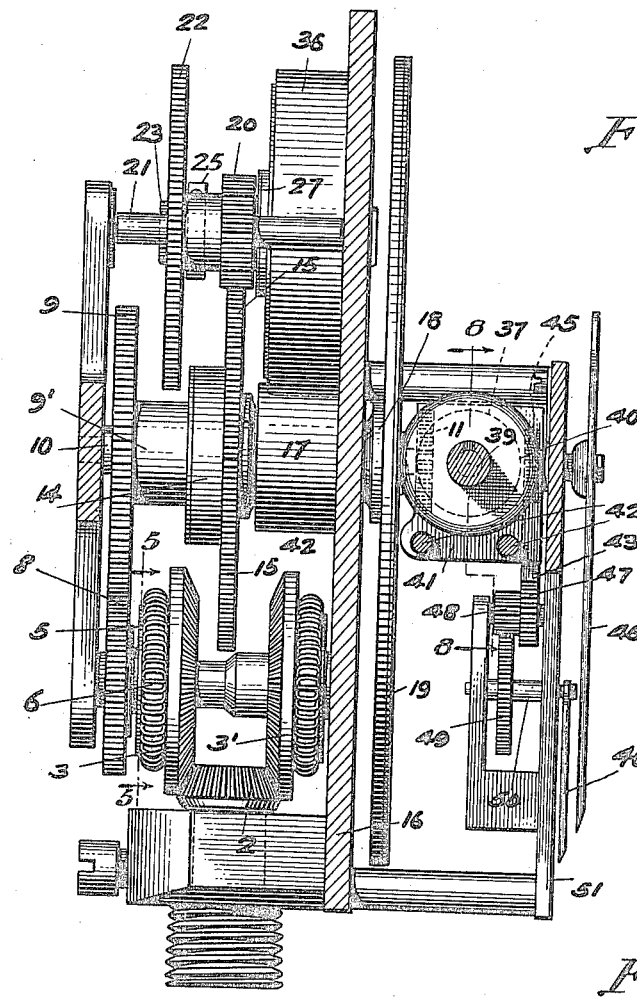
Fig. 2.
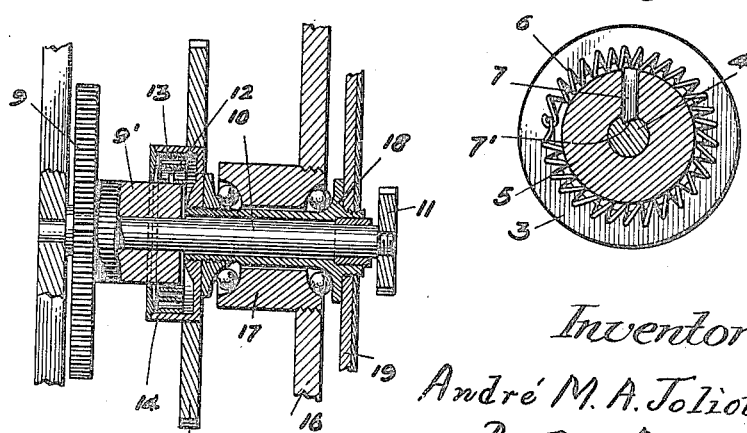
Fig. 4.
Fig. 5.
Inventor:
André M. A. Joliot
By Emil Bauwelke,
Attorney.

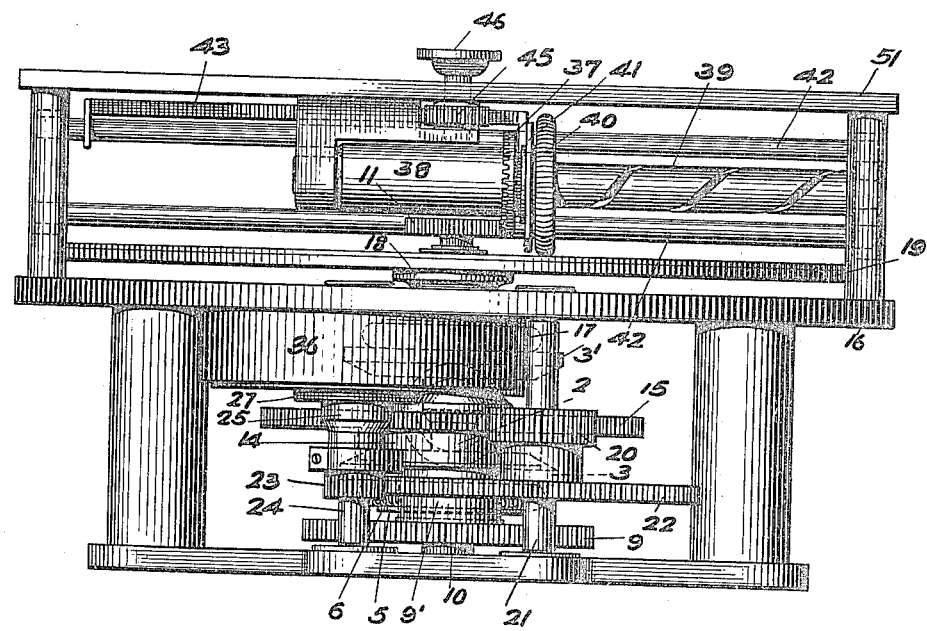

UNITED STATES PATENT OFFICE.

ANDRÉ MARIE ALEXANDRE JOLIOT, OF PARIS, FRANCE, ASSIGNOR TO LA SOCIÉTÉ "AÉRA", OF PARIS, FRANCE.

SPEED-INDICATOR.

1,231,899.   Specification of Letters Patent.   Patented July 3, 1917.

Application filed December 6, 1916. Serial No. 135,388.

*To all whom it may concern:*

Be it known that I, ANDRÉ MARIE ALEXANDRE JOLIOT, a citizen of the Republic of France, and resident of Paris, France, have invented a new and useful Improvement in Speed-Indicators, which improvements are fully set forth in the following specification.

This invention relates to a speed indicator which can be used whenever it is desired to ascertain the speed of revolution of any desired apparatus.

In order to make the following description as clear as possible, the speed indicator is illustrated, by way of example, in the accompanying drawing.

Fig. 2 is a side elevation partly in section on line 2—2, Fig. 1, and

Fig. 3 is a plan,

Fig. 4 is a detail sectional view showing the mounting of the central spindle,

Figure 1:
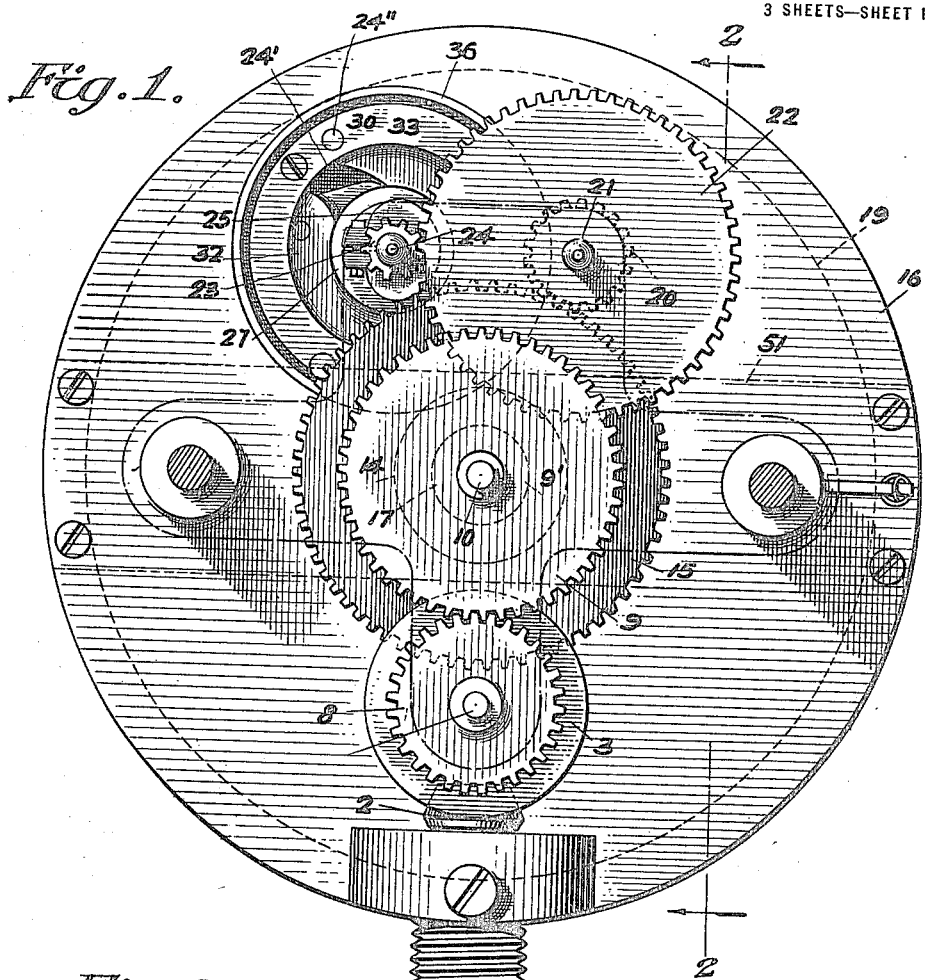
Figure 1 is a front elevation of the apparatus, the case in which it is normally contained, having been removed.
Figure 8:
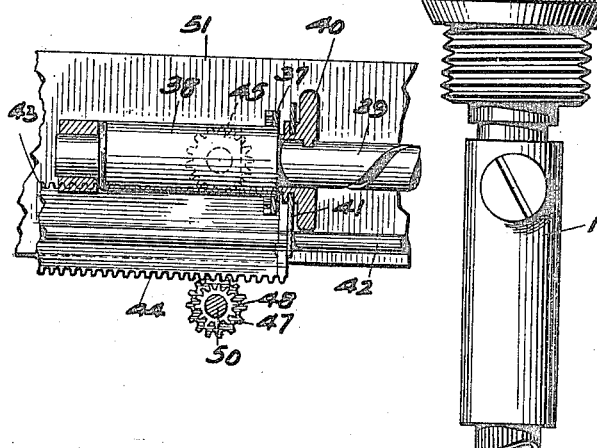

Fig. 5 is a section on line 5—5, Fig. 2, showing one of the driving wheels of the differential gear, Fig. 6 is a section on line 6—6, Fig. 7, showing the brake for limiting the speed of rotation of the central disk, Fig. 7 is a section on line 7—7, Fig. 6, and Fig. 8 is a section on line 8—8, Fig. 2.

The rotary part, the speed of which is to be measured, is connected to the main rod 1 by any suitable means, and the said rod 1 drives directly the pinion 2 of the differential gear constituted by gear wheels 3 and 3'. Each of these gear wheels has its hub loosely mounted on the inner spindle 4 (Fig. 5), and each is moreover secured to a pulley. Only one of these pulleys will be described, the other one being similar. The pulley 5 secured to the gear 3, is provided on its circumference with a spring 6 which has a constant tendency to force a driving pin or key 7 into a groove 7' provided in the spindle 4, there being, of course, one pin 7 for each of the said gears, and, consequently, one groove in the spindle for each of said pins. The inclinations of the walls of the two grooves thus provided in the spindle 4 are such that, when the rod 1 rotates in one direction, the gear 3 will drive the spindle 4, and if the rod 1 rotates in the opposite direction, the gear 3' will drive the spindle 4 which always rotates in the same direction, so that the arrangement as a whole acts as a two-way clutch.

To the said spindle 4 is keyed a pinion 8 which engages with another gear 9 mounted on the end of a spindle 10 (Fig. 4) which at its other end carries a pinion 11. This pinion 11 will therefore rotate at a speed which will depend exclusively, according to the ratio of the gears, on the speed of rotation of the rod 1.

On the other hand, the gear 9 carries a drum 9' to which is secured at 12 one end of an expansible spiral spring 13, the other or free end of which frictionally engages the inner wall of a casing 14 secured to a gear wheel 15. Owing to the rotation of the gear 9, the spring 13 causes the gear wheel 15 to participate in the movement of rotation of the gear 9, provided that no antagonistic force opposes the movement of rotation of the said gear.

The rotation of the gear wheel 15 is rendered possible by the method of mounting shown in Fig. 4. Into the front plate 16 of the mechanism is screwed a sleeve 17 forming a ball race at each of its ends, and into the center of the gear wheel 15 is screwed the rear end of a sleeve 18 forming the companion parts to said ball races, this sleeve 18 extending loosely through the sleeve 17 and being secured at its front end to a disk 19 which, consequently, rotates at the same speed as the gear wheel 15, the spindle 10 extending loosely through sleeve 18. It has been mentioned before that the gear wheel 15 is caused to participate in the movement of rotation of the gear 9 simply by the spring 13, unless opposed by a force acting to brake the said gear wheel 15 in which case the spring will no longer drive said gear wheel 15 under the same conditions.

A device will now be described which is so constructed and arranged that when the gear wheel 15 reaches a given number of revolutions per minute, it will be prevented from exceeding that number of revolutions but will be maintained constantly at this uniform speed whatever be the speed of rotation of the toothed wheel 9.

To that end, the gear wheel 15 engages with a pinion 20 (Fig. 2) keyed to an auxiliary spindle 21 which carries a second gear wheel 22 engaging with a gear wheel 23 keyed to a second auxiliary spindle 24 (Figs.

1 and 3). On the said auxiliary spindle 24 is fixed a disk 24' (Fig. 7) on which can oscillate, about pins 24", weights 32, 33 which are thus caused to participate in the movement of rotation of the disk 24' and consequently in that of the spindle 24. The weights 32, 33 are connected by links 30, 31 to a drum 27, to the inner wall of which is secured one end of spring 26, the other end of which is secured to a sleeve 25 mounted on the spindle 24. By means of this device it is possible to regulate the tension of the spring 26 and therefore its action on the weights 32, 33.

As long as the speed of rotation of the gear wheel 15 does not exceed the limit for which the apparatus has been set, the weights 32 and 33 turn freely with their carrier disk 24', without the steel cylinders or shoes 34 and 35 secured to the said weights exerting a braking action against the inner wall of the case 36. But if at a given moment the gear wheel 15 were to exceed the maximum speed, the weights 32 and 33 will move apart under the action of centrifugal force, thus bringing the shoes 34 and 35 into engagement with the aforesaid case wall, and there will then take place a slipping of the spring 13 which keeps the speed of rotation of the gear wheel 15 at the maximum speed.

It will be seen that, owing to the introduction of this external action into the mechanism driven by the wheel 15, the latter will always rotate at a constant speed, and consequently the same will apply to the disk 19 driven directly by the wheel 15 (Fig. 4). Therefore, on the right of the plate 16, (Fig. 2), there are provided two movable bodies, one of which is the disk 19 rotating at a constant speed, and the other, the pinion 11 rotating at a variable speed which is in proportion to the speed of rotation of the rod 1.

It will now be explained how these two movements are utilized for acting on the indicator needles.

The pinion 11 engages, as shown in plan in Fig. 3, with a gear wheel 37 secured to a drum 38, which, in rotating, rotates a screw 39 formed with a steep thread. Along this screw there is arranged to travel, while being adapted to rotate, a roller 40, the circumference of which is milled or covered with leather to prevent slipping. This roller is in peripheral contact with the disk 19 which, as before stated, rotates at the speed of the gear wheel 15, from which it follows that the said roller itself is frictionally driven by the aforesaid disk.

The sleeve on which the roller 40 is mounted, carries also a plate 41 provided with two holes through which pass guide rods 42 (Figs. 2 and 3). This plate 41 is moreover secured to a double toothed rack 43, 44, The upper rack member or set of teeth 43 engages with a pinion 45, on the spindle of which is mounted a needle 46. The lower rack member or set of teeth 44 engages with a pinion 47 connected with a pinion 48 which in its turn engages with a pinion 49 mounted on a spindle 50, to the end of which is secured a needle 46'. This needle 46' is arranged between the plate 51 and the large needle 46.

The operation of the device will be readily understood from the following description.

As already stated, in front of the apparatus, that is to say to the right of the plate 16, there are disposed the friction disk 19 which rotates at a constant speed, and the pinion 11 which rotates at a variable speed and is driven directly by the rod 1. It follows that the roller 40 tends to rotate at a constant speed due to the action of the disk 19 against which its periphery frictionally contacts, and also tends to rotate at a variable speed due to the action of the screw 39 on which it is mounted. This roller will consequently travel along the screw until it occupies on the disk 19 such a position that the distance which it has traveled on said disk 19 in a unit of time, is the same as the distance traveled by a point on the roller, also in a unit of time, under the action of the speed given to the said roller by the screw 39.

The movement of the roller 40 along the screw spindle produces the movement of the needle 46, due to the rotation of pinion 45 by the upper rack teeth 43, said needle following in a way the positions of the roller 40 along the screw 39. The higher the speed, the more the roller will try to find on the disk 19 a long path, and consequently it will move farther from the center of the disk, so that the needle will indicate a higher speed.

The second needle 46' moves as will be understood at a lower speed.

The movements of the two needles are so combined that the apparatus makes it possible to read speed up to any desired number of revolutions per minute, the small needle 46' indicating by its position the number of thousands, and the large needle 46 indicating the number of revolutions above the thousand and in each thousand.

I claim:

1. In a speed-indicator, the combination of a screw spindle; a roller mounted to travel and rotate thereon; a friction disk contacting with the periphery of said roller and tending to rotate the latter at a constant speed; a gear wheel tending to rotate said spindle at a variable speed; a pair of indicating needles; and a shiftable member operated by said roller during and consequent upon its travel and having two actuating portions, one for each needle, to constantly adjust said needles in conformity with the position of the roller on the spindle.

2. In a speed indicator, the combination of a screw spindle; a roller mounted to travel and rotate thereon; a friction disk contacting with the periphery of said roller and tending to rotate the latter at a constant speed; a gear wheel tending to rotate said spindle at a variable speed; a double rack connected to said roller to travel therewith; and a pair of indicating needles, constantly adjusted in conformity with the position of the roller on the spindle, one of said needles being connected for actuation by each member of the rack.

3. In a speed indicator, the combination of a shaft adapted to be driven at a variable speed which is directly proportional to that of the part whose speed is to be measured; a gear fixed to said shaft to rotate therewith; a friction disk; connections between said shaft and said disk for rotating the latter from the former at a constant speed; a screw spindle connected to be driven at a variable speed by said gear; a roller mounted to travel along said screw spindle and tending to be rotated by said spindle at a variable speed during such travel; said roller having its periphery in contact with said friction disk, so that the friction disk will tend to rotate the roller at a constant speed; a pair of indicating needles; and a shiftable member operatively connected with said roller and having two actuating portions, one for each needle, to constantly adjust said needles in conformity with the position of the roller on said screw spindle.

4. In a speed indicator, the combination of a shaft adapted to be driven at a variable speed which is directly proportional to that of the part whose speed is to be measured; a gear fixed to said shaft to rotate therewith; a sleeve loosely mounted on said shaft; a friction disk fixed to said sleeve; a clutch connection between said shaft and said sleeve for driving the latter from the former, said clutch adapted to slip when the speed of said shaft exceeds a predetermined limit, so as to maintain the speed of said sleeve and friction disk constantly at such limit; a screw spindle connected to be driven at a variable speed by said gear; a roller mounted to travel along said screw spindle and tending to be rotated by said spindle at a variable speed during such travel; said roller having its periphery in contact with said friction disk, so that the friction disk will tend to rotate the roller at a constant speed; and an indicating device operatively connected with said roller to be constantly adjusted in conformity with the position of the roller on said screw spindle.

5. In a speed indicator, the combination of a shaft adapted to be driven at a variable speed which is directly proportional to that of the part whose speed is to be measured; a gear fixed to said shaft to rotate therewith; a sleeve loosely mounted on said shaft; a spring clutch connecting said shaft and sleeve to drive the latter from the former; a centrifugal device operable upon said clutch to automatically effect slippage of the spring when the speed of said shaft exceeds a predetermined limit, so as to maintain the speed of said sleeve constantly at such limit; a friction disk fixed to said sleeve to be driven by the same at a constant speed; a screw spindle connected to be driven at a variable speed by said gear; a roller mounted to travel along said screw spindle and tending to be rotated by said spindle at a variable speed during such travel; said roller having its periphery in contact with said friction disk, so that the friction disk will tend to rotate the roller at a constant speed; and an indicating device operatively connected with said roller to be constantly adjusted in conformity with the position of the roller on said screw spindle.

6. In a speed indicator, the combination of a main rod; a train of gears, including a differential gear, driven by said rod; a shaft driven by said train of gears; a sleeve loosely mounted on said shaft; a gear fixed to said sleeve; a case connected to said gear; a coil spring within said case connected to said shaft and frictionally engaging the wall of said case, so as to rotate the same and the sleeve and gear connected thereto; a centrifugal brake driven from said gear and operable automatically to cause slippage of said spring when the speed of said shaft exceeds a predetermined limit, so as to maintain the speed of said sleeve constantly at such limit; a friction disk fixed to said sleeve to rotate therewith; a screw spindle; a gear fixed to said shaft and connected to drive said spindle at a variable speed; a roller adapted to travel along said screw spindle and tending to be rotated thereby at a variable speed during such travel; said roller having its periphery in frictional contact with said disk, so that the disk will tend to rotate said roller at a constant speed; and an indicating device operatively connected with said roller to be constantly adjusted in conformity with the position of the roller on said screw spindle.

7. In a speed indicator, the combination of a shaft adapted to be driven at a variable speed which is directly proportional to that of the part whose speed is to be measured; a gear fixed to said shaft to rotate therewith; a friction disk; connections between said shaft and said disk for rotating the latter from the former at a constant speed; a screw spindle connected to be driven at a variable speed by said gear; a roller mounted to travel along said screw spindle and tending to be rotated by said spindle at a variable speed during such travel; said roller having its periphery in contact with said friction disk, so that the friction disk will tend to rotate the roller at a constant speed; a double rack connected to said roller to travel therewith; and a pair of indicating needles, one operatively connected with each member of the rack, constantly adjusted in conformity with the position of said roller on said spindle.

In testimony whereof I have signed this specification in the presence of two subscribing witnesses.

ANDRÉ MARIE ALEXANDRE JOLIOT.

Witnesses:
EMILE LEDRET,
CHAS. P. PRESSLY.

Copies of this patent may be obtained for five cents each, by addressing the "Commissioner of Patents, Washington, D. C."